United States Patent [19]
Velez et al.

[11] Patent Number: 6,064,375
[45] Date of Patent: May 16, 2000

[54] MERCHANT ANALYSIS SUPPORT METHOD

[75] Inventors: Arthur Silvio Velez; Joseph T. Coleman, both of Bel Air; John L. Duffy; Edward G. Rippon, both of Abingdon, all of Md.

[73] Assignee: First Data Corporation, Hackensack, N.J.

[21] Appl. No.: 09/107,911

[22] Filed: Jun. 30, 1998

[51] Int. Cl.$^7$ .............................. G06F 3/00; G06F 17/60
[52] U.S. Cl. ..................... 345/326; 345/356; 345/357; 705/38
[58] Field of Search ..................................... 345/326, 356, 345/357, 962, 968; 705/26, 27, 1, 38, 44; 707/104; 709/217–219

[56] References Cited

U.S. PATENT DOCUMENTS

| | | | |
|---|---|---|---|
| 4,992,940 | 2/1991 | Dworkin | 705/26 |
| 5,550,734 | 8/1996 | Tarter et al. | 705/2 |
| 5,848,399 | 12/1998 | Burke | 705/27 |
| 5,890,175 | 3/1999 | Wong et al. | 707/505 |

*Primary Examiner*—Raymond J. Bayerl
*Assistant Examiner*—Sy D. Luu
*Attorney, Agent, or Firm*—Brooks & Kushman P.C.

[57] ABSTRACT

A method of providing merchant information from a computer to a user includes displaying on a computer a plurality of merchant data categories. Each of the merchant data categories contains merchant data fields. One of the merchant data fields is then selected from the plurality of merchant data categories. Merchant information of the selected one of the plurality of merchant data fields is then displayed for a given merchant.

1 Claim, 7 Drawing Sheets

Fig. 5

FDR - AUDIT QUERY

Card Type — 122
- AMEX Invalid PCID
- MC & Visa Not Settle with Issuer
- MC & Visa Not Full Processing
- MC Supermarket ID's
- T & E Full Processing
- T & E Invalid SE's
- T & E Not Settle with Issuer Financial History — 124
- Sales Amt by Fee Attribute/Card/Month
- Sales Amt by Card Type/Month
- Negative Amount Fields
- Negative Count Fields Merchant Vendor Info — 126
- Count by System No
- Count by System No/ Vendor ID
- Count by Vendor ID/System No Billing — 128
- Hold Statements
- Regular Merch W/Discount Paid by Others
- Interchange Income Fee Flag
- Count by Card Type Control — 130
- Hold Statements
- CORP Addr Truncation
- DBA Addr Truncation
- Seasonal Merchants Funding — 132
- Savings DDA's
- Invalid DDA's
- CA 6010 - 6011
- Send ACH To FED Credit/Risk — 134
- Outlet Level
- Card Level Miscellaneous — 136
- Merch Type 'R' W/Dep Type Not Eq 1,2,3
- DEP Type = 1 or 3 and Alt Dep Media = 3
- Stores Draft for EDC Merch
- ETC Type - Cutoff Time
- Prepaid CAT not eq Space or 0

Main Menu

Fig. 6

*Merchant Analysis Support System - [Select Query: FDR Address Corp Trunc]*

File   Edit   Window   Help

| Account No | Corp Name24 | Corp Name6 | Corp Address One 24 | Corp Address |
|---|---|---|---|---|
| 5453610000005040 | CAPITAL REGION MEDICAL C | ENTER | 1432 SOUTHWEST BLVD | |
| 5453611000005127 | ST MARY'S H S FAM HLTH CT | R | PO BOX 427 | 00 |
| 5453613500005057 | KENT STUDER OD PC | | 401 LOCUST STREET, STE 2 | |
| 5453613500005090 | CACIOLO VETERINARY SERV | INC | 11148 OLIVE ST ROAD | |
| 5453613500005167 | SUNDANCE INTERNATIONAL | | 2701 BARRETT STATION RD | |
| 5453613500005235 | APPLEBEES | | 6480 ROCKSIDE WOODS BLV | S |
| 5453613500005536 | FINANCIAL RESOURCES FOR | | 111 HILLTOWN VILL CTR 21 | 0 |
| 5453613500005540 | B.C. SERVICES, INC. | | 519 NORTH MAIN | |
| 5453614000005419 | PORT ROYAL RESORT L P | | 8309 LAKE BRYAN BEACH BL | VD |
| 5453615500005038 | AUTCO DISTRIBUTING INC | | DBA AUTCO CELLULAR | R |
| 5453615500005039 | DADDYS INC DBA | | MCKEEVERS SPRTS GRILL/BA | R |
| 5453615500005097 | ROBERT SCHMUCK | | DBA GREENWOOD GARDEN CNT | R |
| 5453615500005110 | KC POOL/HOT TUB EXCHNG I | INC | 1591 NE RICE RD | |

Record: 1 of 13

Account number: (RMH_ACCOUNT_NUMBER)

MERCHANT ANALYSIS SUPPORT METHOD

TECHNICAL FIELD

The present invention relates generally to methods for providing and analyzing merchant information.

BACKGROUND ART

Banks provide financial services to their customers. Consequently, banks need to know the financial condition and needs of their customers to provide them with the proper services. What is needed is an improved method for use with personal computers for providing merchant information to banks.

SUMMARY OF THE INVENTION

Accordingly, it is an object of the present invention to provide a data warehouse and decision support tool for personal computers that provides data analysis, verification, and ad hoc reporting of non-monetary and monetary merchant data elements.

In carrying out the above object and other objects, the present invention provides a method of providing merchant information from a computer to a user. The method includes displaying on a computer a plurality of merchant data categories. Each of the merchant data categories contains merchant data fields. One of the merchant data fields is then selected from the plurality of merchant data categories. Merchant information of the selected one of the plurality of merchant data fields is then displayed for a given merchant.

The advantages of the present invention are numerous. For instance, on a periodic schedule, the present invention fully supports standard processing of industry reviews, billing analysis, fee assignment, sales by interchange level, and setup/unrealized revenue checks.

These and other features, aspects, and embodiments of the present invention will become better understood with regard to the following description, appended claims, and accompanying drawings.

BRIEF DESCRIPTION OF THE DRAWINGS

FIG. 5 illustrates a graphical user interface displayed when the user selects the audit field button of the interface shown in FIG. 3;

FIG. 6 illustrates a screen displayed when the user selects a category of the interface shown in FIG. 5;

BEST MODES FOR CARRYING OUT THE INVENTION

Figure 1:
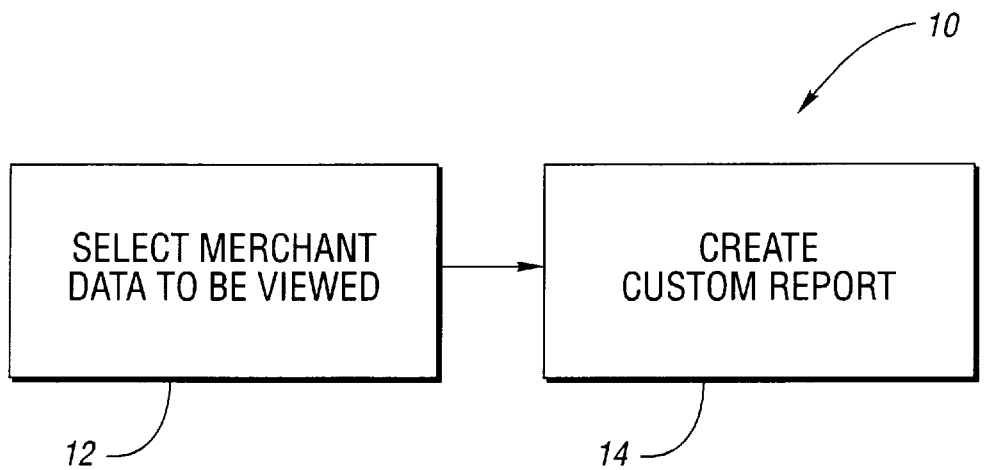
FIG. 1 illustrates a flow diagram representing operation of the system and method of the present invention.

Referring now to FIG. 1, a flow diagram 10 representing operation of the system and method of the present invention is shown. Initially, a user such as a bank selects the merchant data to be viewed as shown in block 12. A custom report of the selected merchant data is then created for the bank user to view as shown in block 14.

Figure 2:
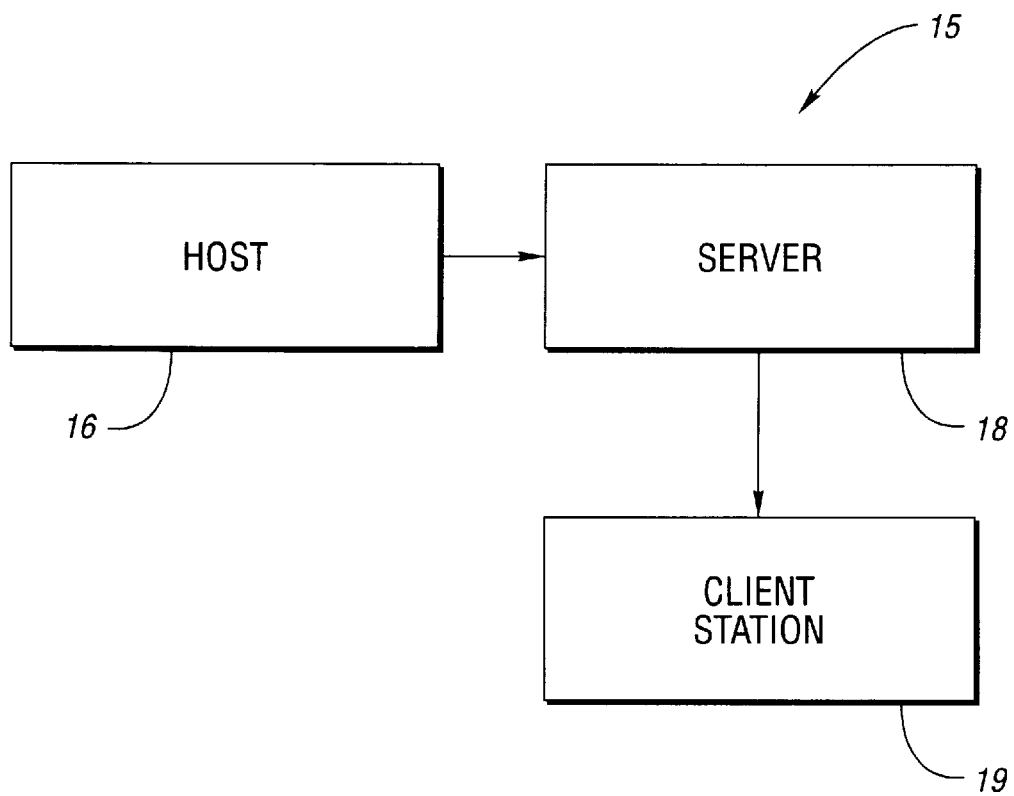
FIG. 2 illustrates a block diagram of a system for carrying out the method of the present invention.

Referring now to FIG. 2, a system 15 for carrying out the method of the present invention is shown. System 15 includes a host 16, a server 18, and a client station (personal computer) 19. Host 16 compiles information regarding merchants into a plurality of different reports. Host 16 then routes the reports to server 18. The bank user at computer 19 can then gain access to the reports from server 18.

Figure 3:
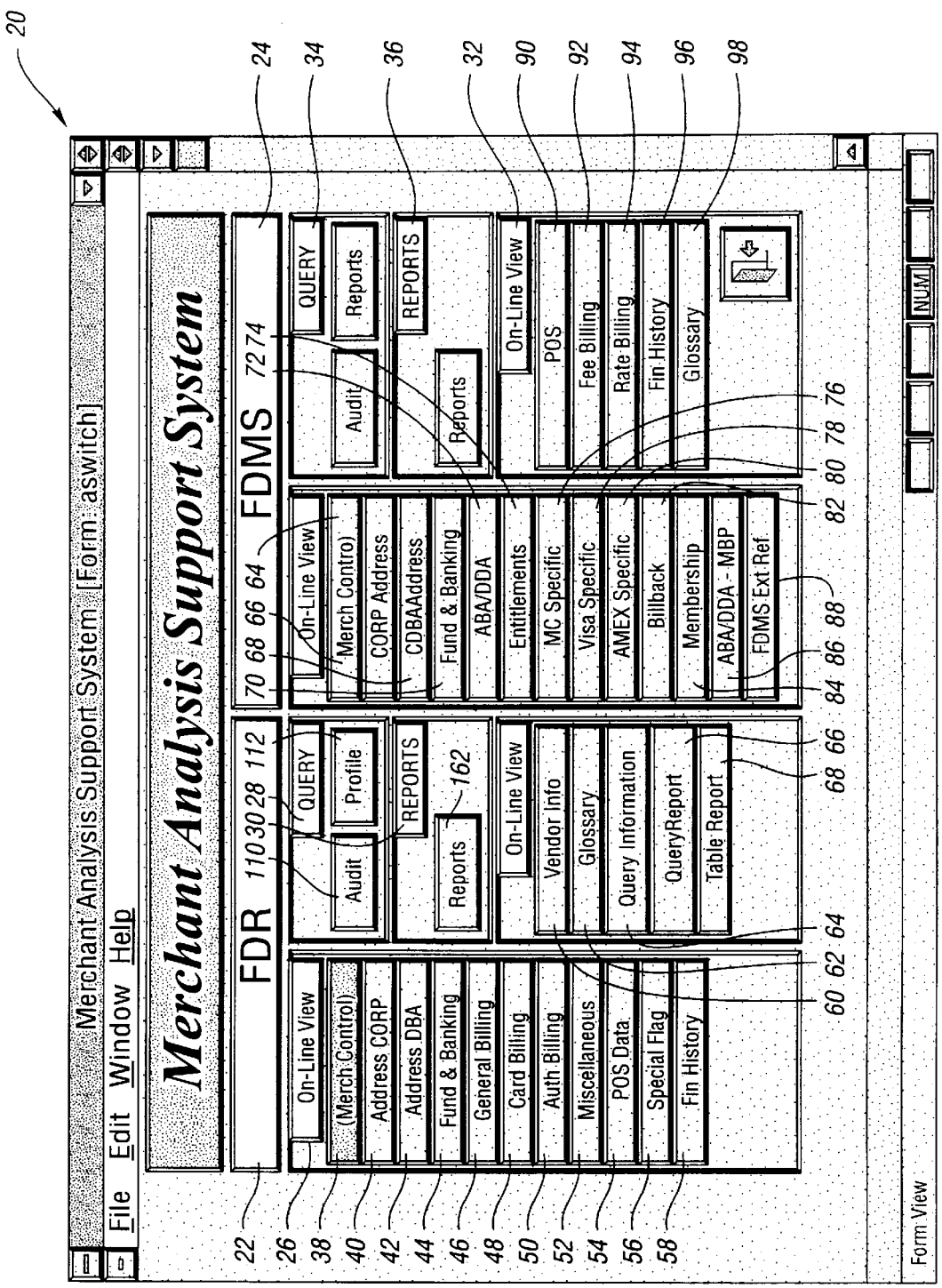
FIG. 3 illustrates a graphical user interface displayed when a user begins the method of the present invention.

Referring now to FIG. 3, in operation of the present invention, a graphical user interface (GUI) 20 is initially displayed on computer 19 for the bank user to view. GUI 20 includes FDR data 22 and FDMS data 24. FDR data 22 includes the following data categories: on-line view 26, query 28, and reports 30. FDMS data 24 includes the same data categories: on-line view 32, query 34, and reports 36.

The bank user can view different types of merchant data fields from on-line view data category 26 of FDR data 22 by selecting the appropriate fields button. The field buttons on GUI 20 corresponding to the merchant data fields of on-line view data category 26 include merchant control 38, address CORP 40, address DBA 42, fund & banking 44, general billing 46, card billing 48, authorized billing 50, miscellaneous 52, POS data 54, special flag 56, fin history 58, vendor information 60, glossary 62, query information 64, query report 66, and table report 68.

Figure 4:
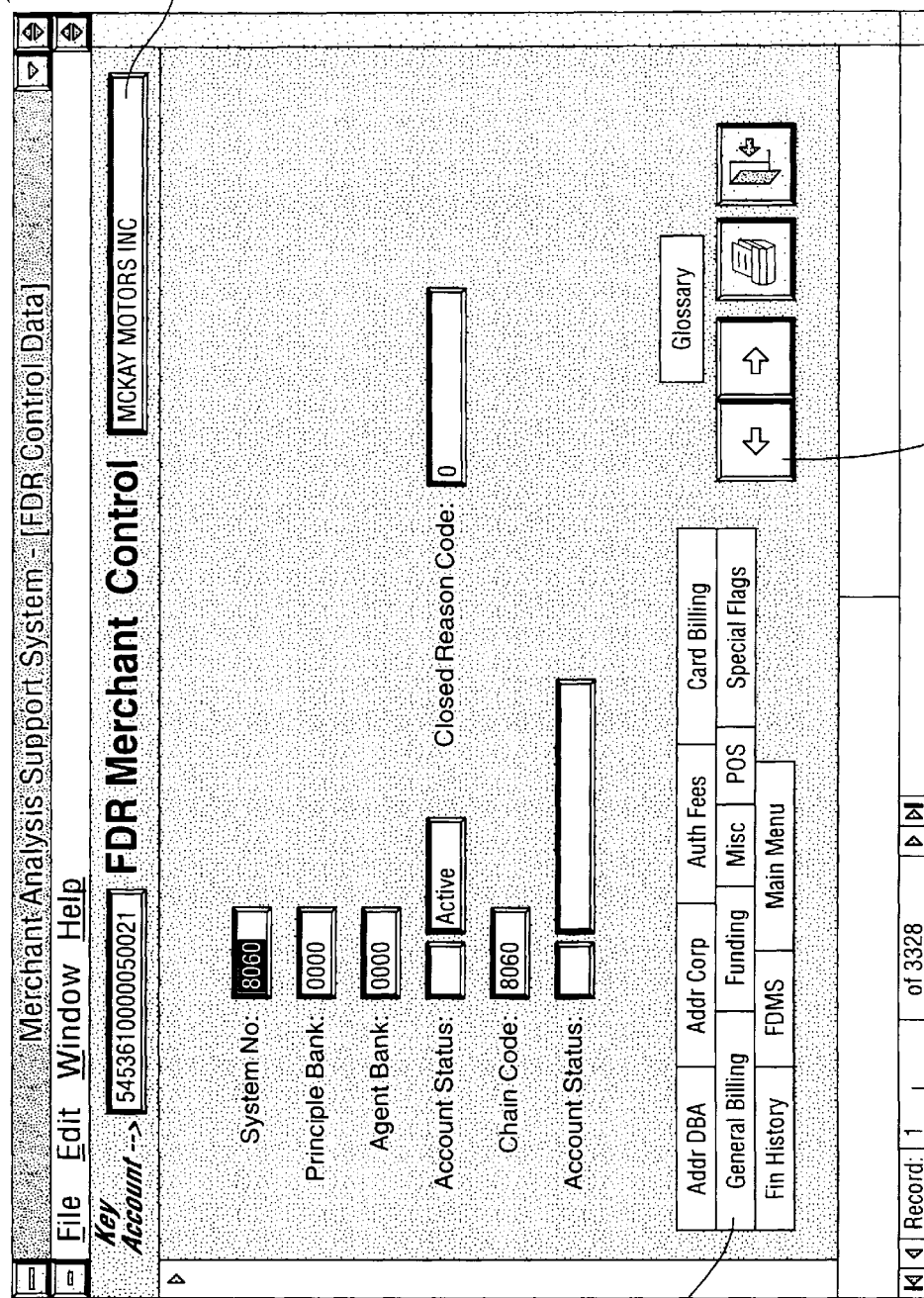
FIG. 4 illustrates a graphical user interface displayed when the user selects the merchant control field button of the interface shown in FIG. 3.

For example, referring now to FIG. 4 with continual reference to FIG. 3, if the bank user selects merchant control field 38 then a GUI 100 is displayed on the computer. GUI 100 displays records of merchant control data for corresponding merchants. The record number out of the total possible number of records is displayed in box 102 and the name of the corresponding merchant is displayed in box 104. The bank user can move between the merchant control data records using the arrow buttons 106. The bank user can also view the other types of merchant data for the corresponding merchant by selecting one of merchant data buttons 108.

The bank user will then move through the application getting additional information concerning the corresponding merchant. For instance, selecting the card billing button from merchant data buttons 108 shows the bank user how many card types the corresponding merchant is available to accept.

Similarly, the bank user can view different types of merchant data fields from on-line view data category 32 by selecting the appropriate fields button. The buttons on GUI 20 corresponding to the merchant data fields of online view data category 32 include merchant control 64, CORP address 66, DBA address 68, fund & banking 70, ABA/DDA 72, entitlement 74, MC specific 76, VISA specific 78, AMEX specific 80, billback 82, membership 84, ABA/DDA-MBP 86, FDMS external reference 88, POS 90, fee billing 92, rate billing 94, fin history 96, and glossary 98.

Figure 7:
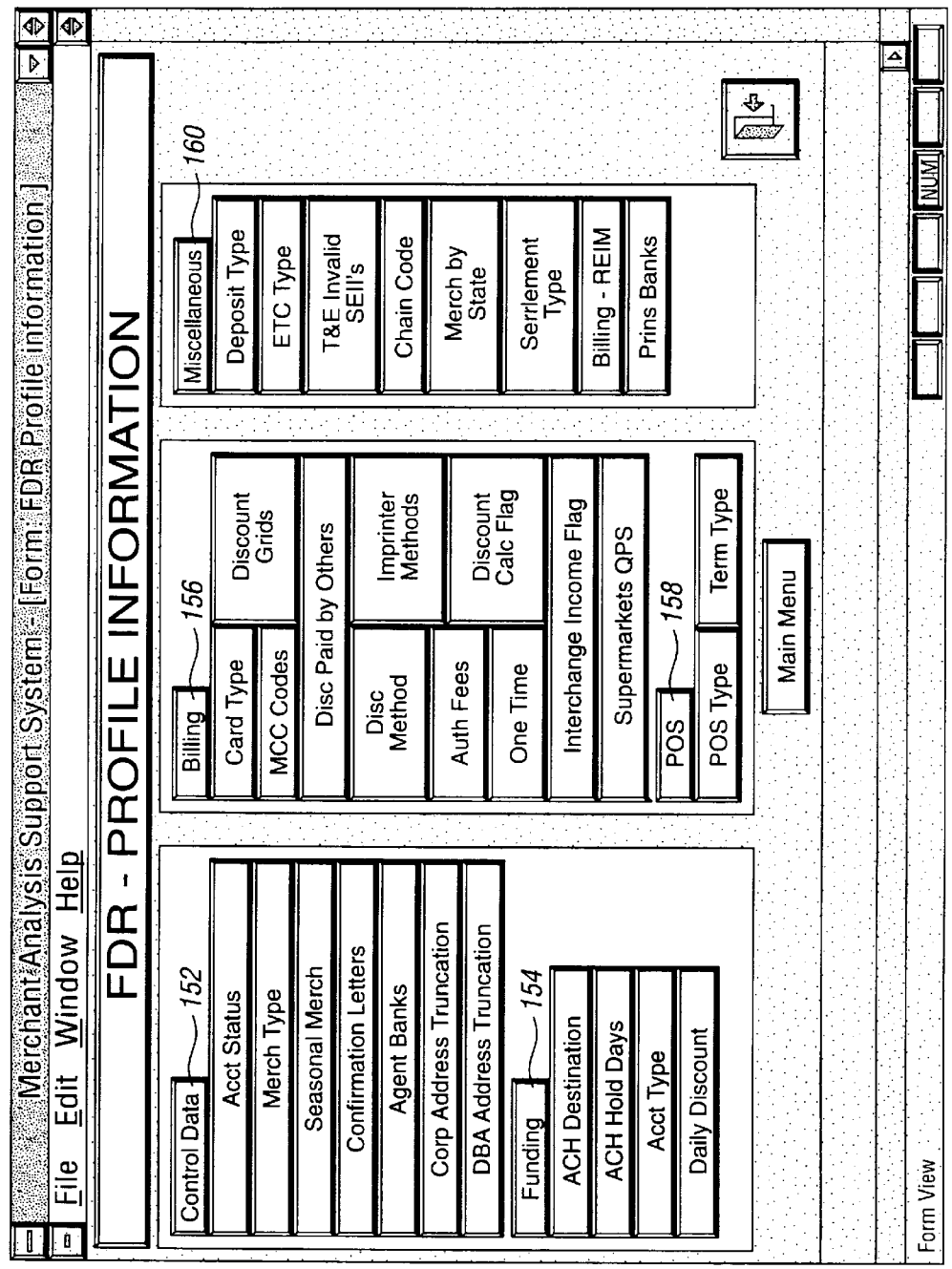
FIG. 7 illustrates a graphical user interface displayed when the user selects the profile field button of the interface shown in FIG. 3.

Referring now to FIGS. 5–7 with continual reference to FIG. 3, the bank user can also view other information by selecting either of audit fields button 110 or profile fields button 112 from query category 28 of GUI 20. Selecting audit fields button 110 causes a GUI 120 to be displayed on the computer as shown in FIG. 5. GUI 120 includes the following categories: card type 122, financial history 124, merchant vendor information 126, billing 128, control 130, funding 132, credit/risk 134, and miscellaneous 136. Each of the categories contains detailed queries for the bank user to select. For instance, the bank user has the ability to select detail queries on card types. A query causes a display screen 140 to display data in columns and rows as shown in FIG. 6.

Selecting profile fields button 112 from query category 28 of GUI 20 causes a GUI 150 to be displayed on the computer as shown in FIG. 7. GUI 150 includes the following categories: control data 152, funding 154, billing 156, POS 158, and miscellaneous 160. Each of these categories also contains detailed queries for the bank user to select.

Figure 8:
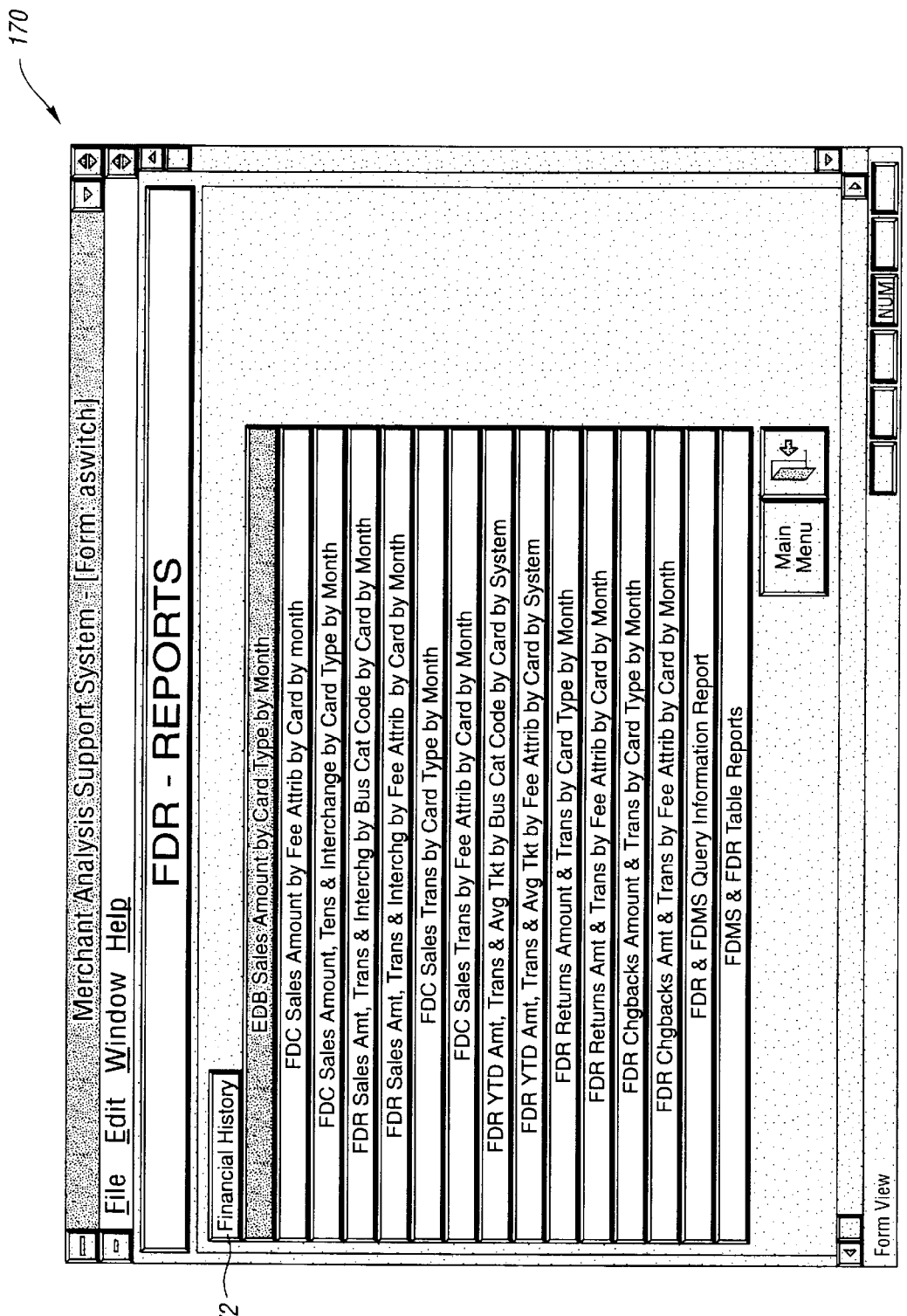
FIG. 8 illustrates a graphical user interface displayed when the user selects the reports field button of the interface shown in FIG. 3.

Referring now to FIG. 8 with continual reference to FIG. 3, the bank user can view more information by selecting reports fields button 162 from reports category 30 of GUI 20. Selecting reports fields button 162 causes a GUI 170 to be displayed on the computer as shown in FIG. 8. GUI 170 includes a financial history category 172. Category 172 contains detailed queries for the bank user to select.

Thus it is apparent that there has been provided, in accordance with the present invention, a merchant analysis support method that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for providing merchant credit information to banks via the Internet, the method comprising:

compiling merchant credit information periodically into reports at a host;

routing the reports from the host to a server operable with the Internet;

browsing the Internet with a browser interface at a bank client computer to access the reports of merchants associated with a bank;

displaying on the bank client computer three merchant data categories including an on-line view merchant data category, a query merchant data category, and a reports merchant data category, wherein each of the merchant data categories contains merchant data fields for the merchants associated with the bank, each of the merchant data fields containing a report;

selecting one of the merchant data fields from the plurality of merchant data categories; and displaying on the bank client computer the report corresponding to the selected one of the merchant data fields for a selected merchant of the merchants associated with the bank.

* * * * *